(12) United States Patent
Goshima

(10) Patent No.: US 9,361,252 B2
(45) Date of Patent: Jun. 7, 2016

(54) ELECTRONIC DEVICE HAVING A PLURALITY OF CPUS AND A METHOD

(71) Applicant: Kyocera Document Solutions Inc., Osaka (JP)

(72) Inventor: Satoshi Goshima, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 27 days.

(21) Appl. No.: 14/541,356

(22) Filed: Nov. 14, 2014

(65) Prior Publication Data

US 2015/0149664 A1    May 28, 2015

(30) Foreign Application Priority Data

Nov. 27, 2013   (JP) ................................ 2013-244535

(51) Int. Cl.
*G06F 13/28*    (2006.01)
*G06F 9/00*    (2006.01)
*G06F 13/00*    (2006.01)

(52) U.S. Cl.
CPC ...................................... *G06F 13/28* (2013.01)

(58) Field of Classification Search
None
See application file for complete search history.

(56) References Cited

U.S. PATENT DOCUMENTS

2006/0053246 A1*  3/2006  Lee ..................... G06F 9/4403
                                                       711/100
2014/0215200 A1*  7/2014  Nakamura ........... G06F 9/4411
                                                       713/2

FOREIGN PATENT DOCUMENTS

JP        2008099013        4/2008

* cited by examiner

*Primary Examiner* — David E Martinez
(74) *Attorney, Agent, or Firm* — K&L Gates LLP

(57) ABSTRACT

An electronic device includes a first CPU, a second CPU, an auxiliary storage unit, and a controller. The auxiliary storage unit includes a first starting program for the first CPU and a second starting program for the second CPU. The first CPU loads the first starting program via the controller, and causes the controller to load the second starting program in DMA transfer. The controller, if the controller is caused by the first CPU to transfer part of the first starting program while the controller is loading the second starting program, stops loading the second starting program. When completing the transfer of the part of the first starting program, the controller restarts loading the second starting program.

14 Claims, 4 Drawing Sheets

ELECTRONIC DEVICE HAVING A PLURALITY OF CPUS AND A METHOD

INCORPORATION BY REFERENCE

This application is based on, and claims priority to corresponding Japanese Patent Application No. 2013-244535, filed in the Japan Patent Office on Nov. 27, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to an electronic device having a plurality of Central Processing Units (CPUs) and a method.

BACKGROUND

A typical electronic device having a plurality of CPUs includes a first CPU, a second CPU, and an auxiliary storage unit that stores a first starting program for the first CPU and a second starting program for the second CPU. The first CPU and second CPU load the first starting program from the auxiliary storage unit in a section unit. Since the electronic device can reduce the time necessary to load the first starting program, the time taken by the first CPU to start according to the first starting program can be reduced. The electronic device prioritizes starting by the first CPU according to the first starting program, so starting by the second CPU according to the second starting program is delayed.

Furthermore, the auxiliary storage device, in the typical electronic device, in which the first starting program and second starting program are stored, may not allow a plurality of accesses at the same time. In this case, while one of the first CPU and second CPU is accessing the auxiliary storage device, the other CPU cannot access the auxiliary storage device, weakening the effect of reducing the time taken by the first CPU. In addition, when the effect of reducing the time taken by the first CPU is weakened, starting by the second CPU according to the second starting program is further delayed.

SUMMARY

The present disclosure related to an electronic device and a method that, even in a case in which the starting program is stored for each of a plurality of CPUs in an auxiliary storage device that does not allow a plurality of accesses at the same time, preferentially reduces the time taken by a particular CPU to start according to its corresponding starting program and also reduces the time taken by another CPU to start according to its corresponding starting program.

An electronic device according to an embodiment of the present disclosure includes a first CPU, a second CPU, an auxiliary storage unit that does not allow a plurality of accesses at the same time, and a controller that controls access to the auxiliary storage unit. The auxiliary storage unit includes a first starting program for the first CPU and a second starting program for the second CPU.

The first CPU loads the first starting program from the auxiliary storage unit via the controller, and causes the controller to load the second starting program from the auxiliary storage unit in direct memory access (DMA) transfer.

The controller, if the controller is caused by the first CPU to transfer part of the first starting program from the auxiliary storage unit while the controller is loading the second starting program from the auxiliary storage unit in the DMA transfer, stops loading of the second starting program, and when completing the transfer of the part of the first starting program, restarts loading of the second starting program.

Additional features and advantages are described herein, and will be apparent from the following Detailed Description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining in the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

An embodiment of the present disclosure will be described below with reference to the drawings.

First, the structure of a multi-function peripheral (MFP) that functions as the electronic device according to an embodiment of the present disclosure will be described.

Figure 1:
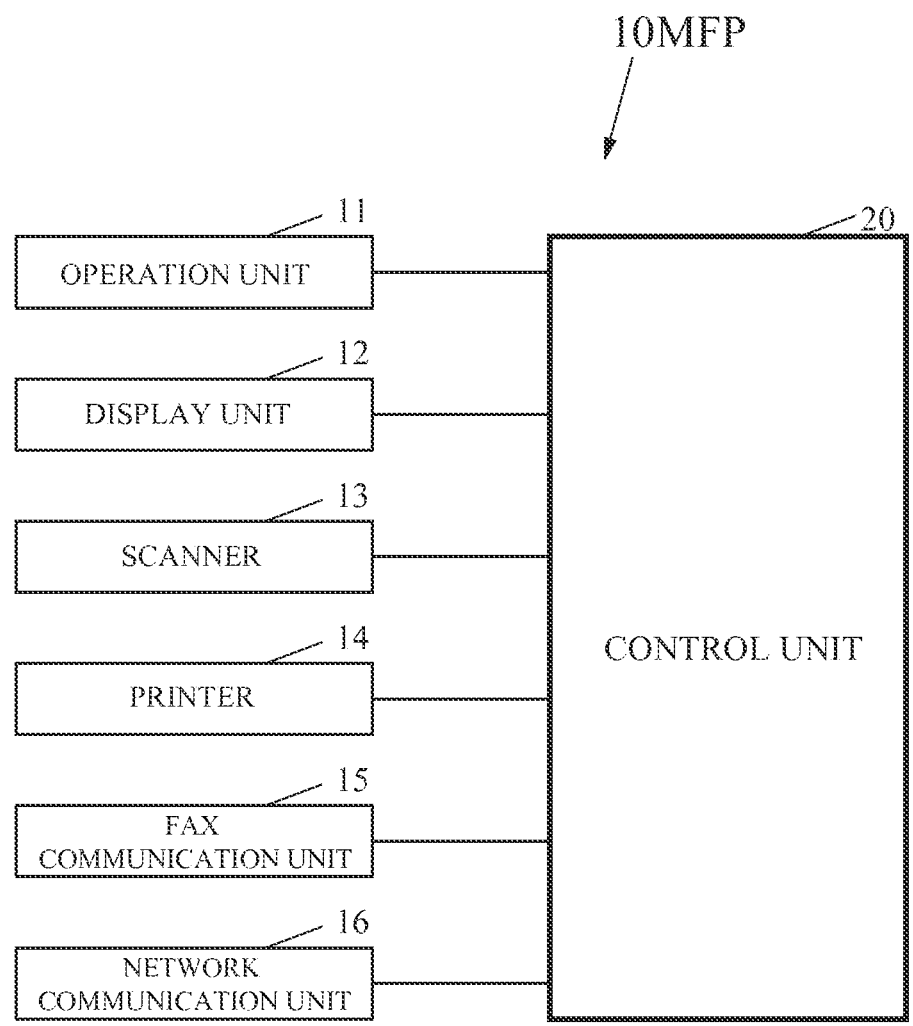
FIG. 1 is a schematic diagram illustrating the block configuration of an MFP according to an embodiment of the present disclosure.

FIG. 1 is a schematic diagram illustrating the block configuration of the MFP 10 according to an embodiment.

As illustrated in FIG. 1, the MFP 10 includes: a manipulation unit 11, which is an input device, including buttons and the like with which the user enters various types of manipulation inputs; a display unit 12, such as, for example, a liquid crystal display (LCD) unit, on which various types of information items are displayed; a scanner 13, which is a read device that reads an image from a draft; a printer 14, which executes printing on a sheet or another recording medium; a facsimile communication unit 15, which performs facsimile communication with an external facsimile device (not illustrated) via a communication line such as a public telephone line; a network communication unit 16, which communicates with an external device (not illustrated) via a local area network (LAN), the Internet, or another network; and a control unit 20 that controls the whole of the MFP 10.

Figure 2:
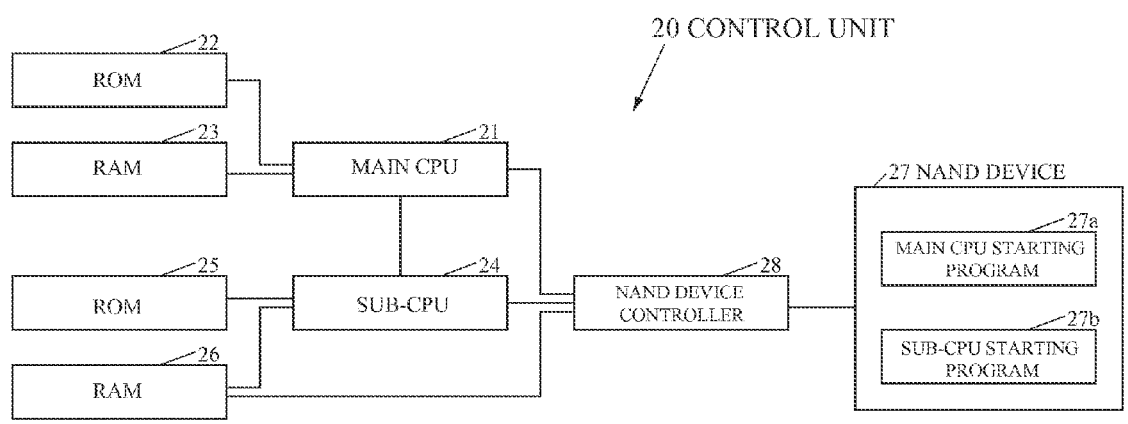
FIG. 2 is a schematic diagram illustrating the block configuration of the control unit in FIG. 1.

FIG. 2 is a schematic diagram illustrating the block configuration of the control unit 20.

As illustrated in FIG. 2, the control unit 20 includes: a main central processing unit (CPU) 21, which functions as a first CPU; a read-only memory (ROM) 22, in which a program for the main CPU 21 and various types of data are stored; a random-access memory (RAM) 23 for the main CPU 21; a sub-CPU 24, which functions as a second CPU; a ROM 25, in which a program for the sub-CPU 24 and various types of data, a RAM 26 for the sub-CPU 24; an NAND device 27, which functions as an auxiliary storage unit that does not allow a plurality of accesses at the same time; and an NAND device controller 28, which functions as a controller that controls accesses to the NAND device 27.

The NAND device 27 stores a main CPU starting program 27a used as a first starting program for the main CPU 21, and also stores a sub-CPU starting program 27b used as a second starting program for the sub-CPU 24.

The NAND device controller 28 handles direct memory access (DMA) transfer and programmed input/output (PIO) transfer.

Next, the operation of the MFP 10 at the time of starting of the MFP 10 will be described.

Figure 3:
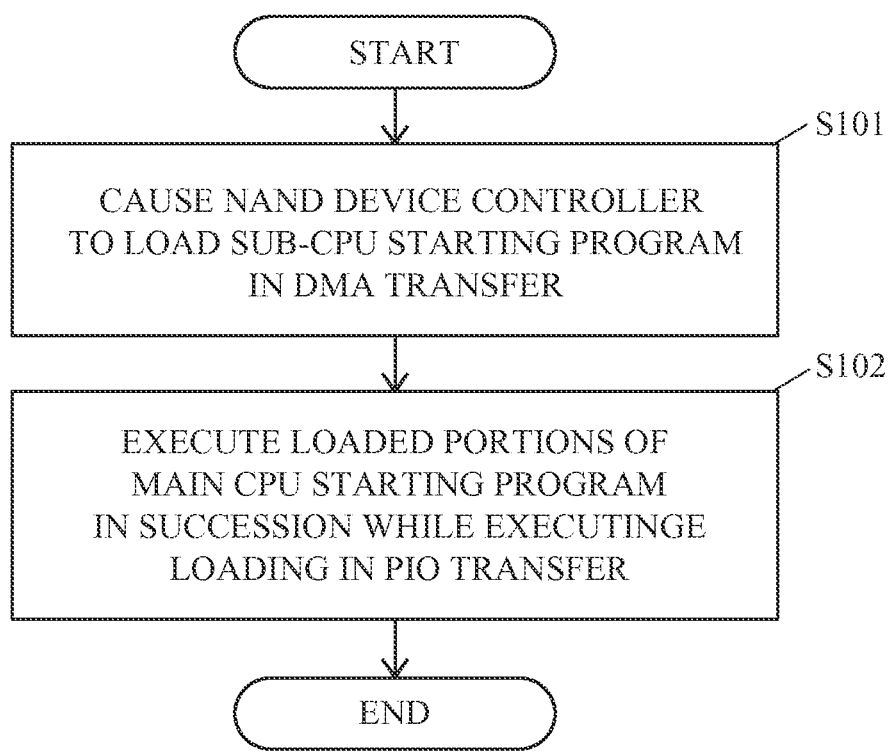
FIG. 3 is a flowchart of an operation executed by the main CPU in FIG. 2 at the time of starting of the MFP.

When caused to start the MFP 10, the main CPU 21 executes the operation illustrated in FIG. 3.

FIG. 3 is a flowchart of the operation executed by the main CPU 21 at the time of starting of the MFP 10.

As illustrated in FIG. 3, the main CPU 21 causes the NAND device controller 28 to load the sub-CPU starting program 27b in DMA transfer from the NAND device 27 to the RAM 26 (S101).

Next, the main CPU 21 loads the main CPU starting program 27a in PIO transfer from the NAND device 27 to the RAM 23 via the NAND device controller 28, and executes loaded portions of the main CPU starting program 27a in succession while executing the loading (S102). That is, the main CPU 21 causes the NAND device controller 28 to transfer only part of the main CPU starting program 27a at a time and executes in succession transferred portions.

When the process in S102 is completed, the main CPU 21 terminates the operation in FIG. 3.

Although, in FIG. 3, the main CPU 21 executes the process in S102 after executing the process in S101, the main CPU 21 may execute the process in S101 in the middle of executing the process in S102.

Figure 4:
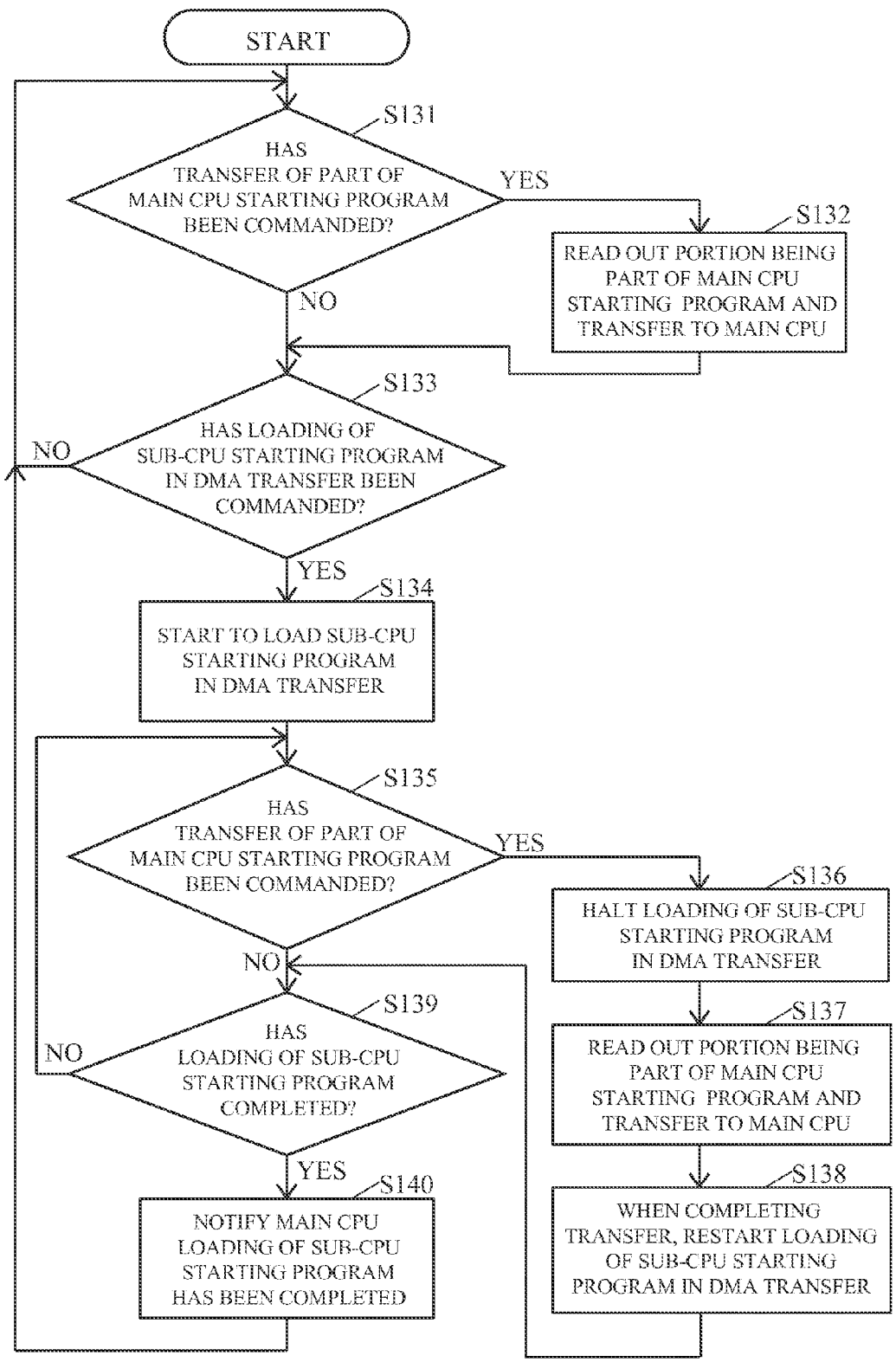
FIG. 4 is a flowchart of an operation executed by the NAND device controller in the control unit at the time of starting of the MFP.

When caused to start the MFP 10, the NAND device controller 28 executes the operation illustrated in FIG. 4.

FIG. 4 is a flowchart of the operation executed by the NAND device controller 28 at the time of starting of the MFP 10.

As illustrated in FIG. 4, the NAND device controller 28 determines whether the main CPU 21 has commanded transfer of part of the main CPU starting program 27a (S131).

If the NAND device controller 28 determines in S131 that transfer of part of the main CPU starting program 27a has been commanded, the NAND device controller 28 reads out a portion commanded by the main CPU 21, the portion being part of the main CPU starting program 27a, from the NAND device 27 and transfers the read-out portion to the main CPU 21 (S132).

If the NAND device controller 28 determines in S131 that transfer of part of the main CPU starting program 27a has not been commanded or the process in S132 has been completed, the NAND device controller 28 determines whether the main CPU 21 has commanded loading of the sub-CPU starting program 27b in DMA transfer (S133).

If the NAND device controller 28 determines in S133 that loading of the sub-CPU starting program 27b in DMA transfer has not been commanded, the NAND device controller 28 executes the process in S131.

If the NAND device controller 28 determines in S133 that loading of the sub-CPU starting program 27b in DMA transfer has been commanded, the NAND device controller 28 starts to load the sub-CPU starting program 27b in DMA transfer (S134). Specifically, the NAND device controller 28 starts to read out the sub-CPU starting program 27b from the NAND device 27 and loads the read-out sub-CPU starting program 27b in the RAM 26.

Next, the NAND device controller 28 determines whether the main CPU 21 has commanded transfer of part of the main CPU starting program 27a (S135).

If the NAND device controller 28 determines in S135 that transfer of part of the main CPU starting program 27a has been commanded, the NAND device controller 28 halts the loading of the sub-CPU starting program 27b in DMA transfer (S136) and reads out a portion commanded by the main CPU 21, the portion being part of the main CPU starting program 27a, from the NAND device 27 and transfers the read-out portion to the main CPU 21 (S137).

When completing the transfer in S137, the NAND device controller 28 restarts loading of the sub-CPU starting program 27b in DMA transfer (S138).

If the NAND device controller 28 determines in S135 that transfer of part of the main CPU starting program 27a has not been commanded or the process in S138 has been completed, the NAND device controller 28 determines whether loading of the sub-CPU starting program 27b in DMA transfer has been completed (S139).

If the NAND device controller 28 determines in S139 that loading of the sub-CPU starting program 27b in DMA transfer has not been completed, the NAND device controller 28 executes the process in S135.

If the NAND device controller 28 determines in S139 that loading of the sub-CPU starting program 27b in DMA transfer has been completed, the NAND device controller 28 notifies the main CPU 21 that loading of the sub-CPU starting program 27b in DMA transfer has been completed (S140) and then executes the process in S131.

When the main CPU 21 is notified by the NAND device controller 28 that loading of the sub-CPU starting program 27b in DMA transfer has been completed, the main CPU 21 causes the sub-CPU 24 to execute the sub-CPU starting program 27b. Thus, the sub-CPU 24 executes the sub-CPU starting program 27b loaded in the RAM 26.

As described above, the MFP 10 prioritizes that the main CPU 21 loads the main CPU starting program 27a from the NAND device 27 via the NAND device controller 28 (S102). Furthermore, while the main CPU 21 is not loading the main CPU starting program 27a from the NAND device 27 via the NAND device controller 28, the NAND device controller 28 loads the sub-CPU starting program 27b from the NAND device 27 in DMA transfer (S134 and S138).

That is, the MFP 10 efficiently transfers the sub-CPU starting program 27b by using the time during which the NAND device 27 is not accessed. Therefore, despite the main CPU starting program 27a and sub-CPU starting program 27b being stored in the NAND device 27 that does not allow a plurality of accesses at the same time, the MFP 10 can preferentially reduce the time taken by the main CPU 21 to start according to the main CPU starting program 27a and can also reduce the time taken by the sub-CPU 24 to start according to the sub-CPU starting program 27b.

Since the main CPU 21 loads the main CPU starting program 27a in PIO transfer from the NAND device 27 and executes loaded portions of the main CPU starting program 27a in succession while executing the loading, the MFP 10 can also reduce the time taken by the main CPU 21 to start according to the main CPU starting program 27a.

Although, in this embodiment, the MFP 10 is structured so that the main CPU 21 loads the main CPU starting program 27a in PIO transfer from the NAND device 27, this is not a limitation; if transfer of the main CPU starting program 27a is processed by the NAND device controller 28 so that the transfer has a higher priority than transfer of the sub-CPU starting program 27b, the NAND device controller 28 may be caused to load the main CPU starting program 27a from the NAND device 27 in the RAM 23 in DMA transfer.

Although, in this embodiment, the MFP 10 has the RAM 23 for the main CPU 21 and the RAM 26 for the sub-CPU 24, this is not a limitation; the RAM 23 and RAM 26 may be physically allocated in different areas in a single RAM.

Although, in this embodiment, the auxiliary storage unit is an NAND device, this is not a limitation; if the auxiliary storage unit does not allow a plurality of accesses at the same time, the auxiliary storage unit may be a non-NAND device.

Although, in this embodiment, the electronic device is an MFP, this is not a limitation; the electronic device may be a copier, a printer, or another image forming apparatus other than MFPs. Alternatively, the electronic device may be a general-purpose personal computer, a home electrical appliance, or another electric device other than image forming apparatuses.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic device comprising:
a first CPU;
a second CPU;
an auxiliary storage unit that does not allow a plurality of accesses at the same time; and
a controller that controls access to the auxiliary storage unit;
the auxiliary storage unit including:
a first starting program for the first CPU; and
a second starting program for the second CPU;
wherein the first CPU i) loads the first starting program from the auxiliary storage unit via the controller, and ii) causes the controller to load the second starting program from the auxiliary storage unit in direct memory access (DMA) transfer, and
wherein the controller, i) if the controller is caused by the first CPU to transfer part of the first starting program from the auxiliary storage unit while the controller is loading the second starting program from the auxiliary storage unit in the DMA transfer, stops loading the second starting program, and ii) when completing the transfer of the part of the first starting program, restarts loading the second starting program.

2. The electronic device according to claim 1, wherein the controller handles the DMA transfer and programmed input/output (PIO) transfer.

3. The electronic device according to claim 2, wherein while the first CPU is loading the first starting program in a first random-access memory (RAM) in the PIO transfer from the auxiliary storage unit via the controller, the first CPU executes in succession loaded portions of the first starting program.

4. The electronic device according to claim 1, wherein the controller determines whether the first CPU has commanded loading of the second starting program in the DMA transfer, if the controller determines that the transfer of the part of the first starting program has not been commanded or the transfer of the part of the first starting program has been completed.

5. The electronic device according to claim 4, wherein the controller loads the second starting program in a second RAM.

6. The electronic device according to claim 1, wherein the controller notifies the first CPU that loading of the second starting program has been completed.

7. The electronic device according to claim 6, wherein the first CPU causes the second CPU to execute the second starting program and the second CPU executes the second starting program loaded in the second RAM.

8. A method for starting an electronic device including a first CPU, a second CPU, an auxiliary storage unit that does not allow a plurality of accesses at the same time, and a controller that controls access to the auxiliary storage unit, wherein the auxiliary storage unit includes a first starting program for the first CPU and a second starting program for the second CPU,
the method comprising:
loading the first starting program from the auxiliary storage unit via the controller,
causing the controller to load the second starting program from the auxiliary storage unit in direct memory access (DMA) transfer,
stopping the loading of the second starting program, if the controller is caused by the first CPU to transfer part of the first starting program from the auxiliary storage unit while the controller is loading the second starting program from the auxiliary storage unit in the DMA transfer, and
restarting the loading of the second starting program, when completing the transfer of the part of the first starting program.

9. The method according to claim 8 comprising:
handling the DMA transfer and programmed input/output (PIO) transfer.

10. The method according to claim 9 further comprising:
executing in succession loaded portions of the first starting program, while the first CPU is loading the first starting program in a first random-access memory (RAM) in the PIO transfer from the auxiliary storage unit via the controller.

11. The method according to claim 8 comprising:
determining whether the first CPU has commanded loading the second starting program in the DMA transfer, if the controller determines that the transfer of the part of the first starting program has not been commanded or the transfer of the part of the first starting program has been completed.

12. The method according to claim 11 comprising:
loading the second starting program in a second RAM.

13. The method according to claim 8 comprising:
notifying the first CPU that loading of the second starting program has been completed.

14. The electronic device according to claim 13 comprising:

causing the second CPU to execute the second starting program; and executing the second starting program loaded in the second RAM.

* * * * *